United States Patent [19]

Setter et al.

[11] 4,327,498
[45] May 4, 1982

[54] MAGNETIC COMPASS COMPENSATION SYSTEM

[75] Inventors: Alfred C. Setter; Donald J. Kesselring, both of Phoenix, Ariz.

[73] Assignee: Sperry Corporation, New York, N.Y.

[21] Appl. No.: 130,758

[22] Filed: Mar. 17, 1980

[51] Int. Cl.³ .............................................. G01C 17/38
[52] U.S. Cl. ....................................... 33/333; 33/352; 33/356; 33/361; 73/178 R; 324/225
[58] Field of Search ...................... 33/355 R, 356, 357, 33/358, 361, 362, 352, 351, 333, 353; 324/202, 225, 244; 73/178 R

[56] References Cited

U.S. PATENT DOCUMENTS

| | | | |
|---|---|---|---|
| 2,692,970 | 10/1954 | Tolles | 33/356 X |
| 2,852,859 | 9/1958 | Depp | 324/244 X |
| 3,530,375 | 9/1970 | Passier | 324/244 X |
| 3,639,828 | 2/1972 | Salvi | 324/244 |
| 3,696,518 | 10/1972 | Leat | 33/357 |
| 4,112,754 | 9/1978 | Suminsby | 73/178 R |

*Primary Examiner*—William D. Martin, Jr.
*Attorney, Agent, or Firm*—Howard P. Terry

[57] ABSTRACT

In a magnetic compass compensation system suitable for use within a ferrous land vehicle, a secondary magnetic sensor senses, the total magnetic field as components along a three axis system drawn vertical, lateral and transverse to the ferrous vehicle. Compensation signals corresponding to the permanent and induced magnetic fields of the vehicle are isolated from the total magnetic field. The compensation signals are applied to compensation coils surrounding a primary magnetic sensor for providing an output equivalent to the horizontal components of the earth's undisturbed magnetic field.

7 Claims, 7 Drawing Figures

MAGNETIC COMPASS COMPENSATION SYSTEM

"The Government has rights in this invention pursuant to Contract Number DAAK70-79-C-0017 awarded by the Department of the Army."

BACKGROUND OF THE INVENTION

1. Field of the Invention

This invention generally relates to magnetic compass compensation systems, and more specifically, to a compensation apparatus suitable for use in highly ferrous land vehicles such as military armored personnel carriers and tanks.

2. Description of the Prior Art

Various types of North finding or seeking devices for navigable craft which employ compensation systems to eliminate the craft's permanent and induced magnetic fields are well known in the prior art, many of these devices being specifically designed for use in aircraft. These devices basically employ an Earth's magnetic field sensor for sensing the horizontal components thereof and a mechanical or electronic compensation unit attached to or electrically associated therewith which may be adjusted during a compensation swing to remove the disturbing effects of the vehicle's permanent and induced magnetic fields. Without such compensations, the vehicle's own magnetic field disturbances would make the readings of the magnetic sensor useless as a navigation aid.

In most magnetic compass applications, such as in marine vessels and aircraft, the primary disturbance or distortion of the earth's magnetic field in the vicinity of the magnetic compass sensor or indicator, i.e, the local earth's field, is produced by so called "hard iron" in the vehicle. This hard iron effectively produces a permanent magnetic field of its own which in combination with the earth's field distorts the latter so that the compass reading is in error. The hard iron, being fixed in the craft can be easily and conventionally compensated by determining through a compass swing, its horizontal components which may be "bucked out" or reduced to zero by generating equal and opposite magnetic field components in the vicinity of the compass. Since the hard iron or permanent disturbing field is fixed in the craft and is uninfluenced by the earth's field, the compensation is effective for all craft headings and attitudes. A secondary disturbance or distortion of the earth's magnetic field in the vicinity of the magnetic compass sensor is produced by the so called "soft" iron in the vehicle. This soft iron effectively produces a disturbance or distortion of the local field caused by the magnetic field induced in the soft iron elements of the vehicle by the earth's magnetic field. Therefore, when the vehicle changes attitude relative to the field direction of the earth, the magnitude of the field induced in the vehicle's soft iron also changes due to the change in the angle of incidence of the earth's field thereon. Thus, the compensation for the induced or soft iron error in the local earth's field is a much more difficult problem. As a matter of fact, many compass system installations, particularly in aircraft do not attempt to compensate for the soft iron error produced by significant attitude changes due to its temporary nature during normal flights.

Prior workers in the field of compass compensation have proposed compensation schemes which attempt to compensate for the induced field errors in a compass system, such as illustrated by Tolles in U.S. Pat. No. 2,692,970. This patent addresses the underlying theoretical aspects of such soft iron compensation for aircraft. However, in the Tolles scheme, the magnetometers associated with the compensation apparatus must be so located and fixed to the aircraft's vertical and transverse axes that they pick-up only corresponding components of the earth's field free of the hard iron and soft iron disturbances, since it is these values that are resolved as functions aircraft pitch and roll attitudes to provide the hard and soft iron compensation fields at the compass magnetometer. In general, the Tolles arrangement might be useful in highly ferrous land combat vehicles such as tanks if the pick-up magnetometers could be mounted on a high mast far removed from the metal of the tank. This may be and usually is unacceptable in modern tank warfare.

The present invention, therefore, results from a requirement that the primary magnetic field sensor or navigation system compass sensor be mounted within the protective armor of the vehicle. Further requirements included a provision for compass accuracy within a predetermined small error (e.g. $\pm 3°$) not only when the vehicle or tank is on level ground but also when it is on uneven ground resulting in tilts as great as $\pm 15$ to $\pm 20$ degrees in pitch and roll.

SUMMARY OF THE INVENTION

The present invention comprises a magnetic compass system which is capable of providing an accurate measure of the magnetic heading of a highly ferrous land vehicle, such as a combat tank, by means of sensor apparatus wholly contained within the protective confines of the vehicle's armor plate; that is, subject to the most severe permanent and induced magnetic field disturbances. The magnetic sensor apparatus of the present invention includes a primary magnetic field sensor arranged to sense only the horizontal components of the earth's magnetic field, such as a conventional pendulously mounted flux valve. The magnetic sensor apparatus further includes a secondary magnetic field sensor fixed in the vehicle closely adjacent to the primary sensor and arranged to sense directly and at all vehicle attitudes the components of the total magnetic field of the vehicle and the earth measured parallel to the primary longitudinal, vertical and transverse vehicular axes; wherein the total magnetic field includes corresponding components of the earth, the vehicle's permanent, and the vehicle's induced magnetic fields. The magnetic sensor apparatus includes an adjustable electronic processor, for isolating from the total magnetic field components those components produced by the vehicle's permanent and induced magnetic fields, and a plurality of magnetic field generator coils surrounding the primary sensor and fixed relative to the vehicle's primary axes and responsive to those isolated permanent and induced fields but of opposite senses to thereby remove their effects on the primary sensor. Feedback circuits responsive to the field generators send feedback to the electronic apparatus for generating the earth's field components necessary to define the induced field components and for removing any effects of the coil fields on the closely adjacent secondary or fixed axes sensor.

DESCRIPTION OF THE PREFERRED EMBODIMENT

For a more complete appreciation of the invention, attention is invited to the following description of a preferred embodiment of the invention, as shown in the attached drawings.

Figure 1:
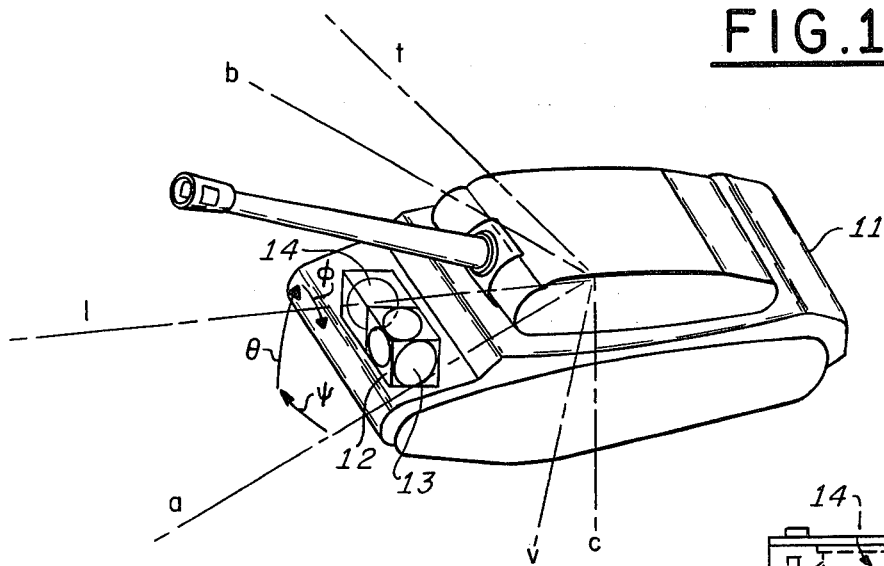
FIG. 1 illustrates a typical installation of the magnetic detector assembly of the present invention within a combat tank and FIG. 1A illustrates an enlargement of the detector assembly itself.
Figure 1A:
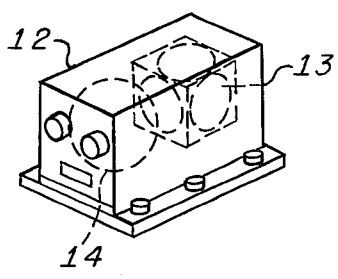

FIG. 1 includes a typical ferrous land combat vehicle, such as a tank 11, which has a magnetic compass detector assembly 12 completely enclosed within the protective ferrous armor plate of the tank. A pair of three orthogonal axis systems are drawn through the tank 11. The first axis system corresponds to the earth's axes through the tank and are designated by the two horizontal axes a,b and the vertical axis c. The second axis system corresponds to the longitudinal, transverse, and vertical axes of the tank 11 and are designated by the letters l, t and v, respectively. FIG. 1A illustrates an enlargement of the magnetic detector assembly 12 which is located totally within the protective confines of the tank 11 including first (or compensation) detector means 13 and second (or compass) detector means 14 in close proximity and preferably contained within a common container or housing 12. It will be appreciated that the vehicle's coordinate axis system is preferably that illustrated, i.e., its longitudinal transverse and vertical axis system but the invention in its broadest aspects is not limited or restricted in any way thereto and that in practice any other coordinate axis system may be used.

Figure 2:
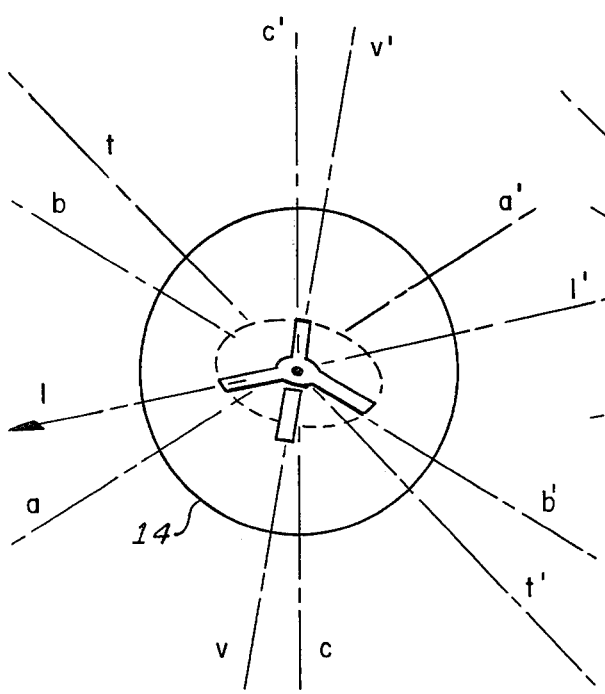
FIG. 2 illustrates schematically the fixed three axis flux valve and the alignment of its principle sensing axes relative to the primary axes of the vehicle.

Referring to FIG. 2, the fixed three axis flux valve 14 is schematically illustrated which may be of the type disclosed in the present assignee's U.S. Pat. No. 3,873,914. This flux valve is fixed relative to the vehicle so that its sensing axes are aligned parallel to the major vehicle's l, t and v axes. Thus, it measures directly the longitudinal, transverse and vertical components of the total magnetic field at its location, including those of the earth's magnetic field, the tank's permanent magnetic field and the tank's induced magnetic field. FIG. 2 also includes the pair of axis systems a-a', b-b', c-c' and l-l', t-t', v-v' illustrated in FIG. 1.

Figure 3:
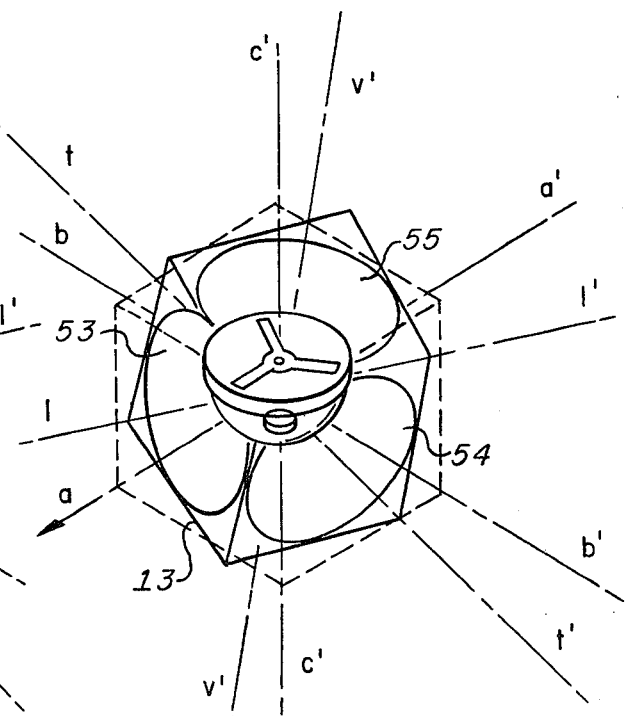
FIG. 3 illustrates similarly the pendulous two axis flux valve.

Referring to FIG. 3, the primary magnetic field sensor 13 is illustrated. It is a pendulous two axis flux valve of the type disclosed in the present assignee's U.S. Pat. No. 3,641,679. It is mounted in the vehicle so as to generate signals representative of the horizontal components of the magnetic field at its location. Similarly, the pendulous flux valve may generate signals representative of other components of earth's magnetic field. Also associated with primary external signals applied sensor 13 are magnetic compensation coils 53, 54 and 55 which in accordance with the invention generate fields which cancel out the disturbances caused by the tank's permanent and induced magnetic fields as will be described below. FIG. 3 also includes the identical orthogonal axis systems in FIG. 2.

In the following discussion of the electronics portion of the present invention, which generates the currents supplied to the compensation coils 53, 54 and 55 to produce the compensating magnetic fields, reference will be made to the various field component vectors and relationships which are defined as follows:

| EQUATION NUMBER | EQUATION | DESCRIPTION |
| --- | --- | --- |
| 1 | Earth's Magnetic Field $= H_{ei} i + H_{ek} k$ | Undisturbed horizontal and vertical components of the Earth's field |
| 2 | $H_{el} = H_{ei} COS\psi COS\theta - H_{ek} SIN\theta$ | Earth's magnetic field along vehicle axes. |
| 3 | $H_{et} = H_{ei}(COS\psi SIN\theta SIN\phi - SIN\psi COS\phi) + H_{ek} COS\theta SIN\phi$ | $\psi$ = heading |
| 4 | $H_{ev} = H_{ei}(SIN\psi SIN\phi + COS\psi SIN\theta COS\phi) + H_{ek} COS\theta COS\phi$ | $\theta$ = pitch $\phi$ = roll |
| 5 | $H_{el} = H_{ei} COS\psi$ | Earth's magnetic field |
| 6 | $H_{et} = H_{ei} SIN\psi$ | along vehicle axes under |
| 7 | $H_{ev} = H_{ek}$ | level conditions. |
| 8 | Hard Iron Field Along Vehicle l axis $= H_{pl}$ | Vehicle permanent |
| 9 | Hard Iron Field Along Vehicle t axis $= H_{pt}$ | (hard iron) magnetic |
| 10 | Hard Iron Field Along Vehicle v axis $= H_{pv}$ | field. |
| 11 | $H_{sl} = K_{ll}H_{el} + 0\, K_{tl}H_{et} + 0\, K_{vl}H_{ev}$ | Vehicle induced |
| 12 | $K_{st} = K_{lt}H_{el} + K_{tt}H_{et} + K_{vt}H_{ev}$ | (soft iron) magnetic |
| 13 | $K_{sv} = K_{lv}H_{el} + K_{tv}H_{et} + K_{vv}H_{ev}$ | field. |
| 14 | $H_l = H_{el} + H_{pl} + H_{sl}$ | Total magnetic field |
| 15 | $H_t = H_{et} + H_{pt} + H_{st}$ | directed along vehicle. |
| 16 | $H_v = H_{ev} + H_{pv} + H_{sv}$ | axes |
| 17 | $-H_{lcomp} = H_{pl} + H_{sl}$ | |
| 18 | $-H_{tcomp} = H_{pt} + H_{st}$ | Compensation fields from fixed external coils surrounding 2-axis pendulous flux valve. |
| 19 | $-H_{vcomp} = H_{pv} + H_{sv}$ | |
| 20 | $H_l' = H_l - H_{lcomp} = H_{el}$ | |
| 21 | $H_t' = H_t - H_{tcomp} = H_{et}$ | Compensated field imposed on 2-axis pendulous field. |
| 22 | $H_v' = H_v - H_{vcomp} = H_{ev}$ | |

Figure 4:
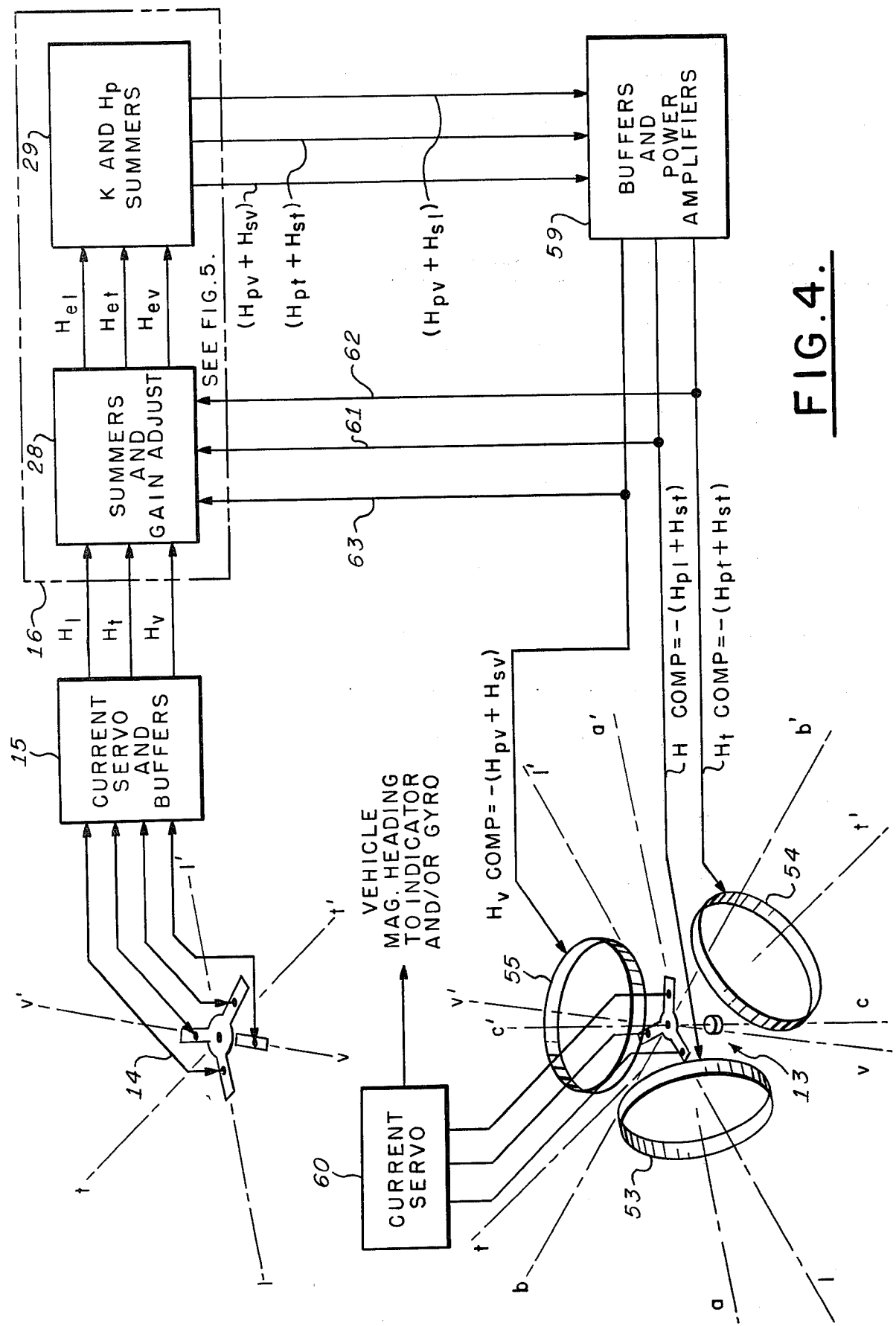
FIG. 4 illustrates in block diagram format a preferred embodiment of the invention.

FIG. 4 discloses a simplified block diagram of a preferred embodiment of the present invention. The invention includes the secondary or compensation magnetic field detector means 14 including a fixed three axis flux valve for directly sensing the longitudinal, transverse and vertical components of the total magnetic field of the vehicle at its location therein. Signals corresponding to the longitudinal and transverse components are provided conventionally by the horizontally disposed legs of the flux valve while signals corresponding to the vertical component is supplied by the vertical leg as shown. The operation of this detector is fully disclosed in the above U.S. Pat. No. 3,873,914. These signals are supplied to a current servo 15 which may be of the type disclosed in the present assignee's U.S. Pat. No. 3,678,593. In the manner described in that patent, the outputs of the current servo 15 are electrical signal voltages that represent the vector components of the total magnetic field at its location in the tank measured along the longitudinal, transverse, and vertical axes thereof. These output signals are then coupled to a closed loop electronic processor 16, the basic function of which is to provide d.c. currents to the compensation coils 53, 54 and 55 surrounding the primary or compass flux valve 13 having an amplitude and polarity such as to cancel, within the system accuracy limits the permanent and induced magnetic fields of the vehicle at that location and at all vehicle headings and vehicle roll and pitch tilt angles. It is to be noted that in accordance with this invention, since the fixed axis total field flux valve senses the components of the total magnetic field directly in the vehicle's coordinate axes and since the compensation coils 53, 54 and 55 are also referenced to the vehicle's coordinate axes, no trigonometric transformations or resolutions relative to the earth's coordinate axes are required. Thus, the fixed sensor provides directly signals proportional to the total field components $H_l$, $H_t$ and $H_v$ in accordance with equations 14, 15 and 16 above wherein the values of $H_{el}$, $H_{et}$ and $H_{ev}$ are defined by equations 2, 3 and 4, the values of the vehicle's permanent field are $H_{pl}$, $H_{pt}$ and $H_{pv}$ as defined at 8, 9 and 10 above and wherein the complex equations of the vehicle's induced magnetic field are $H_{sl}$, $H_{st}$ and $H_{sv}$ as defined in equations 11, 12 and 13 above. As shown schematically in FIG. 4, the total field components $H_l$, $H_t$ and $H_v$ are applied to summing and gain adjustment circuits 28 which through feedback control loops, as will be described below, provide outputs proportional to the components of only the earth's magnetic field $H_{el}$, $H_{et}$ and $H_{ev}$ (equations 2, 3 and 4 above). These outputs are supplied to a group of potentiometer and summing networks 29 where the component values of the vehicle's permanent field $H_{pl}$, $H_{pt}$ and $H_{pv}$ and the component values of the vehicle's induced field $H_{sl}$, $H_{st}$ and $H_{sv}$ are established and summed. These latter signals are suitably buffered and gain adjusted by circuits 59 and the outputs are applied to the field generating coils 53, 54 and 55 surrounding the pendulous compass sensor or flux valve 13. The same outputs are fed back to the summing and gain adjust circuits 28 via leads 61, 62, 63 where they are summed with the fixed sensor output to effectively remove their corresponding components from the total field components leaving only the earth's field components $H_{el}$, $H_{et}$ and $H_{ev}$.

The compensated output of the pendulous two axis flux valve or compass flux valve 13 is coupled via its usual three output leads to a second current servo 60 in conventional fashion to provide an output proportional to the heading of the tank 11 relative to magnetic north. The current servo 60 may be coupled to position a conventional synchro driven indicator as described, for example, in the present assignee's U.S. Pat. No. 3,646,537 or it may be coupled to the directional gyro of a gyromagnetic compass of the type described, for example, in the present assignee's U.S. Pat. No. 2,357,319.

Figure 5:
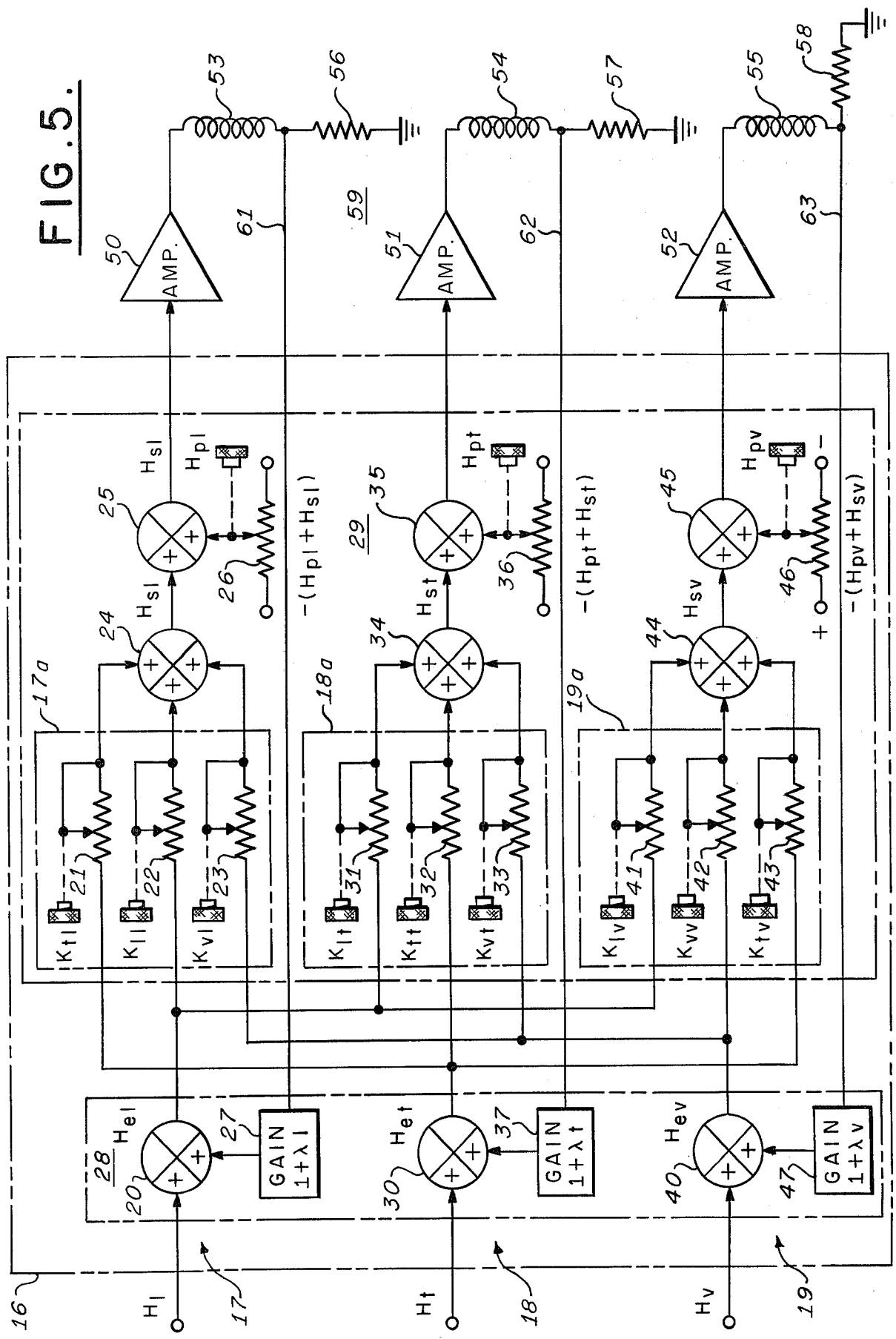
FIG. 5 illustrates a more detailed schematic of an electronic processor means illustrated in FIG. 4.

Referring now to FIG. 5, the electronic processor 16 is depicted in schematic format. The electronic processor 16 consists of three channels 17, 18 and 19 which have nearly identical electronic components. Each of the channels receive the output d.c. signals from the current servo and buffers 15 of FIG. 4. Channel 17 receives the signal representative of the longitudinal component, $H_l$, of the total magnetic field measured along the longitudinal axis of the tank, channel 18 receives the signal representative of a component, $H_t$, of the total magnetic field measured along the transverse axis of the tank, and channel 19 receives the signal representative of a component, $H_v$, of the total magnetic field measured along the vertical axis of the tank. Since each of the channels 17, 18 and 19 are substantially identical in structure and function only one such channel, channel 17 will be described in detail in order to avoid unnecessary repetition.

The induced magnetic field is the magnetic disturbance caused by so called "soft" ferrous materials. Unlike the permanent field, the induced magnetic field is temporary and varies the effect of the earth's field, $H_{ei}$ and $H_{ek}$ (see relationship 1 above), in realigning the magnetic axes of the crystal domains comprised of iron molecules. The amplitude and direction of the induced magnetic field varies as a function of the magnitude and direction of the external field incident on the vehicle and, therefore, will change as the vehicle assumes various attitude and headings relative to the earth's field.

Equations 11 through 13 above relate the induced magnetic field to the vehicle heading and attitude and the earth's external magnetic field components; $H_{el}$, $H_{et}$ and $H_{ev}$ from equations 2 through 4. The first subscript of the K's (constant) refers to the direction of the externally applied field which gives rise to an induced magnetic field directed as indicated by the second subscript. For example, in equation 11 above, the external field ($H_{et}$) applied to the transverse axis of the vehicle results in generation of an induced magnetic field ($K_{tl} H_{et}$) directed along the vehicle longitudinal axis. Likewise, ($K_{vl} H_{ev}$) is the induced magnetic field directed longitudinally that results from the external field ($H_{ev}$) applied to the vertical axis. The term ($K_{ll} H_{el}$) is the induced magnetic field which results along the longitudinal axis due to an external field applied to this same axis. The term ($H_{sl}$) represents the total induced magnetic field generated in the longitudinal axis. Thus, each of the three external fields ($H_{el}$, $H_{et}$ and $H_{ev}$) will generate three induced fields directed along the vehicle axes. Referring to equations 2 through 4, it is noted that these induced fields are a function of vehicle tilt.

Fortunately, like the hard iron or permanent fields, which incidentally do not change with vehicle attitude change, since they are fixed in the vehicle, the magnitude of components of the induced field changes can be determined accurately during a compass swing of the vehicle and during certain desired headings when the vehicle is tilted, a procedure well known to those skilled in the magnetic compass systems art. For example, the K values of equations 11, 12 and 13 above may be calculated at the cardinal headings of the vehicle with the vehicle level involving equations 5, 6, 7 above and then, at one of these headings, say zero degrees, the vehicle is tilted or pitched up to an arbitrarily selectd 15 degrees thereby involving equations 2, 3 and 4 above, and the K values modified accordingly. The above-mentioned Tolles patent provides the detailed equations for deriving these K values.

Returning now to FIG. 5, the d.c. voltage output of current servo 15 proportional to $H_l$ is applied to summing junction 20 where it is summed with the negative d.c. feedback voltage signal, as will be described below, the resultant signal $H_{el}$ being applied to a resistance means or network 17a which also receives the outputs $H_{et}$ and $H_{ev}$ of the corresponding summing junctions 30 and 40 of channels 18 and 19 respectively. Similarly, the $H_{el}$ voltage signal 17 is applied to the resistance networks 18a and 19a of channels 18 and 19 respectively. The resistance networks 17a, 18a and 19a constitute the means for providing measures of the induced magnetic field of the vehicle $H_{sl}$, $H_{st}$ and $H_{sv}$ in accordance with equations 11, 12 and 13 above. Again, since all three networks are identical only one will be described. For example, potentiometers 22, 21 and 23 for network 17a, are connected to receive, respectively, voltages proportional to the earth's field components along longitudinal ($H_{el}$), transverse ($H_{et}$) and vertical ($H_{ev}$) axes. The movable contacts of these potentiometers are set in accordance with the values of $K_{ll}$, $K_{tl}$, and $K_{vl}$ respectively which values are determined during the compass swing as described above. The outputs of these potentiometers are summed at junction 24, the resultant output of which is the voltage having the value, $H_{sl}$, the induced magnetic field along the longitudinal axis at the fixed field sensor 14 location in accordance with equation 11 above. The values of $H_{st}$ and $H_{sv}$ are obtained in the same manner; in channel 18 through networks 18a and potentiometers 31, 32 and 33 and in channel 19 through network 19a and potentiometer 41, 42 and 43.

As stated above, the disturbing permanent magnetic field is called "hard iron" disturbance which refers to the type of iron producing the effect. The "hard iron" field (Hp) is essentially permanent in magnitude and direction and, therefore, can be expressed in terms of the vehicle body axes as given by equations 8, 9 and 10 above. From these equations, it is clear that any point in time the vehicle permanent magnetic field like the induced field, may occur over long periods of time and may be compensated through periodic compass swings.

Referring again to FIG. 5 and specifically to channel 17, the magnitude of the permanent field disturbances relative to the vehicle longitudinal axis $H_{pl}$ is determined during the compass swing of the vehicle accomplished, as stated above, by well known procedures. For example, such a compass swing may be accomplished in accordance with the procedures set forth in U.S. military standard "MIL-STD 765A" available from the U.S. Department of Defense. For the purpose of providing the value of $H_{pl}$, a further resistance network 26 is provided which comprises a d.c. excited potentiometer, the wiper of which is set to the value of $H_{pl}$ determined during the swing. This signal is combined or summed with the induced field component $H_{sl}$ in at summing junction 25. The values of $H_{pt}$ and $H_{pv}$ are similarly inserted into channels 18 and 19 through potentiometers 36 and 46 and summed with the values of $H_{st}$ and $H_{sv}$ through summing junctions 35 and 45, all respectively. Thus, the output of summing junction 25 of channel 17 is a signal proportional to the sum of components of the induced magnetic field and the permanent magnetic field parallel to the vehicle longitudinal axis, that is, a signal proportional to $H_{sl}+H_{pl}$. This signal then may be applied, properly poled, to the coils 53 to generate an equal and opposite magnetic field at the pendulously mounted primary or compass flux valve 13 to buck out both components of the disturbing induced and permanent fields whereby the compass flux valve senses only the component $H_{el}$ of the earth's field parallel to the vehicle longitudinal axis all as set forth in equations 17 and 20 above. For this purpose, the output of summing junction 25 is applied to a voltage to current amplifier 50 to provide the oppositely polarized $H_{sl}+H_{pl}$ current signals at the proper amplitude level to coil 53.

In accordance with the present invention, the field generating current supplied to the coil 53 is measured by means of current measuring resistor 56 and fed back via lead 61 as the other input to summing junction 20 through a gain adjusting network 28 where it is substracted from the original input signal $H_l$ to thereby provide the $H_{el}$ signal required for the isolation of the $H_{sl}$ components as defined by equation 11 above.

The proximity of the fixed flux valve 14 to the compensation coils 53, 54 and 55 surrounding the pendulous flux valve 13, however, may cause a stray compensation field to be detected by the fixed flux valve 14. If left uncorrected, this field will generate errors in the determination of $H_{el}$, $H_{et}$ and $H_{ev}$. Therefore, the gain adjustment means 27, 37 and 47 coupled to the electronic paths 61, 62 and 63 correct for this stray compensation by introducing a predetermined gain factor $1+\lambda$ into the feedback signals. The term $\lambda$ represents a proportional difference in magnitude between the compensation signals fed back from coils 53, 54 and 55 and the stray compensation from coils 53, 54 and 55 detected by the fixed flux valve 14. For example, if the compensation signals fed back are ten times greater than the stray compensation detected, then $\lambda$ is 1/10 or 0.1.

The structure and operation of the channels 18 and 19 is the same as channel 17 above described for producing the compensation currents to coils 54 and 55, respectively, in accordance with equations 18, 19 and 21, 22 above.

Figure 6:
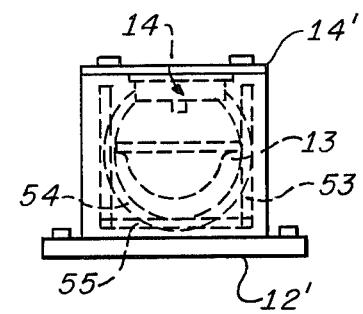
FIG. 6 illustrates a modification of the invention.

There may be applications of the present invention where space available for the magnetic detector assembly 12 is at a premium, particularly inside tanks. The modification of the present invention illustrated in FIG. 6 reduces by about fifty percent the size of the detector assembly. As shown, the housing 12' is in the general shape of a cube having the fixed coils 53, 54 and 55 secured to at least three orthogonal cube interior faces (for example, one each on the lateral faces and one on one of the vertical faces or one centrally thereof) and with the pendulous flux valve sensor 13 mounted centrally thereof. In order to conserve detector unit volume, the fixed axis flux valve sensor 14 is secured to the top of the unit; for example, is secured to the underside of the unit's top cover 14'. Clearly, in this location the fixed field sensor 14 is more subjected to the coil fields than the side-by-side arrangement of FIG. 1a. However, in accordance with the teachings of the present invention, it is only necessary to increase the magnitude of the feedback signals on leads 61, 62 and 63 by respectively increasing the gain of gain control or gain adjustment means 27, 37 and 47. For example, if, in the arrangement of FIG. 1a, the feedback signal on the maximum correction axis is say 13 percent of the input signal and on the other axes say 2 percent and 3 percent respectively, the corresponding gain for the arrangement of FIG. 6 might be on the order of 50 percent, 20 percent and 30 percent respectively.

Therefore, the objects of the present invention have been achieved. The fixed axis valve measures the total magnetic field of the vehicle at its location therein and at all tilt attitudes thereof which measures are used through closed loop circuitry to isolate the induced and permanent disturbing magnetic fields from the total field, which isolated fields are then represented by currents and applied to coils surrounding the pendulous main or compass flux valve to generate equal and opposite compensating fields thereat so that the compass flux valve measures only the horizontal component of the earth's magnetic as desired.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A magnetic compass system for a highly ferrous vehicle comprising:

first magnetic field detector means fixed on said vehicle for generating first signals corresponding to components of the sum of the earth's magnetic field and the vehicle's permanent and induced magnetic fields thereat parallel to a coordinate axis system fixed relative to the vehicle, second magnetic field detector means pendulously mounted on said vehicle adjacent said first detector means for generating second signals corresponding to predetermined components of the earth's magnetic field thereat fixed relative to the earth, magnetic field generating means fixed on said vehicle proximate to said second detector means for generating magnetic field components parallel to said fixed vehicle coordinate axes system, processor means coupled to said first detector means and responsive to said first component signals for providing compensation signals corresponding to the components of the vehicle's permanent and induced magnetic field along said fixed vehicle primary coordinate axis system including feedback control means, means for supplying said compensation signals to said field generating means for generating corresponding magnetic fields proximate said second detector substantially equal and opposite to said components of the vehicle's permanent and induced magnetic fields whereby said second detector means provides output signals proportional to the said predetermined components of the earth's magnetic field only, and means for supplying said compensation signals to said feedback control means for effectively removing said compensation signals from said first component signals.

2. A magnetic compass system as set forth in claim 1 wherein said vehicle coordinate system comprises the vehicle longitudinal, transverse and vertical axes and wherein said predetermined components of the earth's magnetic field are the horizontal components relative to the earth.

3. The magnetic compass system as set forth in claim 1 wherein said processor means for providing said compensation signal components corresponding to the vehicle's induced magnetic field requires signals corresponding to the components of the earth's field only and wherein said feedback control means subtracts said compensation signals from said first signal components to provide only said earth's field components.

4. The magnetic compass system as set forth in claim 3 wherein said field generating means comprises coil means and wherein said processor means comprises first and second adjustable impedance means responsive to signal voltages corresponding to said first signal components and to signal voltages corresponding to said compensation signal components and adjustable in accordance with a compass swing of said vehicle for providing signal voltages corresponding to said compensation signal components, means for supplying said compensating signal voltages as corresponding currents to said coil means, and means responsive to said coil currents for supplying said voltage signals corresponding to said compensation component signals.

5. The magnetic compass system as set forth in claim 1 wherein said feedback control means further includes gain control means for effectively removing the effects of said field generating means on said first detector means.

6. The magnetic compass system as set forth in claim 5 wherein said magnetic field generating means includes Helmholtz-like coil means orthogonally disposed about said second magnetic detector means and wherein said first magnetic detector means is disposed adjacent to but exteriorly of said coil means.

7. The magnetic compass system as set forth in claim 5 wherein said magnetic field generating means includes Helmholtz-like coil means orthogonally disposed about said second magnetic detector means and wherein said first magnetic detector means is disposed closely adjacent to and at least partially within said coil means.

* * * * *